3,375,064
PRODUCTION OF THE HYDROGEN ION EX-
CHANGED FORM OF A CRYSTALLINE
ZEOLITE
Joseph N. Miale, Trenton, N.J., and Paul B. Weisz,
Media, Pa., assignors to Mobil Oil Corporation, a corporation of New York
No Drawing. Filed Nov. 23, 1964, Ser. No. 413,342
21 Claims. (Cl. 23—111)

ABSTRACT OF THE DISCLOSURE

The invention is directed to producing the hydrogen ion exchanged form of a crystalline aluminosilicate zeolite by contacting an ammonium exchanged crystalline aluminosilicate with an anhydrous, gaseous acid.

---

The present invention relates to crystalline aluminosilicate catalysts, methods for preparing such catalysts and methods for employing them in conversion reactions. More specifically, the invention relates to crystalline aluminosilicates in the H or acid form and to their preparation and use.

It has recently been found that the crystalline aluminosilicates are useful and highly active catalysts for a wide variety of organic conversion reactions, such as isomerization, alkylation, polymerization, cracking and others.

The crystalline aluminosilicates are metal salts in which the metal cation may be an ion of an alkali metal, such as sodium or potassium, or alkaline earth metals, such as calcium and their equivalents. It has been found that the original metal cations of the crystalline aluminosilicates may be replaced by ion-exchange and that such replacement may be utilized to modify the catalytic properties of the material. The original metal cations may be replaced by other metal cations or by hydrogen ions which have been found to enhance the activity of such catalysts for many conversions and especially for the cracking of hydrocarbon feed material.

Various methods have been developed for exchanging the original metal cations of a crystalline aluminosilicate with hydrogen ions. One such method comprises contacting the molecular sieve with an aqueous solution of an acid, such as hydrochloric acid, which results in substitution of hydrogen ions for at least some of the metal cations. Another method comprises contacting the molecular sieve with a solution of ammonium chloride. This results in replacement of at least some of the metal cations with ammonium ions. The material is then heated to decompose the ammonium ions, driving off ammonia and leaving hydrogen ions at some of the sites formerly occupied by the metal cations.

However, certain disadvantages have been encountered with each of the known methods for converting crystalline aluminosilicates to the H or acid form by exchanging the original metal cations for hydrogen ions. For example, some crystalline aluminosilicates are unstable in the presence of the acid solutions used for ion-exchange. Where the exchange is carried out by substitution of an ammonium ion and subsequent decomposition by heat, it has been found that the ammonium ion is quite stable and that repeated, severe heat treatments are required to decompose all of the ammonium groups.

Where the crystalline aluminosilicate is sensitive to acid, ion-exchange by acid leaching may cause part or all of the crystallinity of the material to be destroyed with consequent loss of catalytic activity and efficiency. Where a process of ammonium ion substitution and heating is employed, the failure of a substantial portion of the ammonium ions to be decomposed also results in a loss of activity by reducing the number of active hydrogen ion or acid sites on the catalyst.

For example, if a catalyst, still containing a substantial portion of ammonium groups is used in catalytic cracking, the heat of cracking and regeneration completes the conversion of the catalyst to the H form. The activity of the catalyst in the cracking reactor varies, therefore, from an initially low to a relatively higher final value. The variation in catalyst activity in turn results in inefficiency and unpredictability in the results obtained in the cracking system.

An object of the present invention, therefore, is to provide a new method for producing H or acid crystalline aluminosilicates.

Another object of the invention is to provide a method for producing H crystalline aluminosilicates without destroying the crystallinity of the aluminosilicate.

An additional object of the present invention is to provide H crystalline aluminosilicates of higher catalytic activity.

The method by which the above objects and many other highly desirable advantages of the present invention are achieved will be apparent in the light of the following detailed description of the invention.

According to the present invention, high activity H aluminosilicates are produced without loss of crystallinity by substituting ammonium ions for the original metal cations of the molecular sieve and then decomposing the ammonium ion with an anhydrous, gaseous acid.

According to a preferred embodiment of the invention, the crystalline aluminosilicate is converted to the $NH_4$ form by contact with an aqueous solution of an ammonium salt, e.g., ammonium sulfide. The $NH_4$ form is then separated from the aqueous phase and is contacted with an anhydrous, gaseous acid, such as a hydrogen halide. This decomposes the ammonium zeolite with the production of an ammonium halide and leaves the crystalline aluminosilicate in the H form.

The crystalline aluminosilicates of the present invention are highly porous materials having the following general formula:

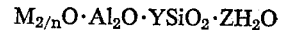

$$M_{2/n}O \cdot Al_2O \cdot YSiO_2 \cdot ZH_2O$$

in the salt form, wherein $n$ is the valence of the metal cation M, Y is the number of moles of silica, and Z is the water of hydration.

Crystalline aluminosilicates of the above structure, sometimes referred to as crystalline zeolites or molecular sieves, may be activated by removal of the water of hydration and when so activated, they possess sites capable of promoting catalytic conversions. Upon dehydration, the aluminosilicates are found to be highly porous and possess numerous surface cavities and internal pores connecting the cavities. These pores are of substantially constant diameter, generally in the range of from 3 to 13 Angstroms, the exact size depending upon the composition and structure of the specific aluminosilicate.

A number of natural crystalline aluminosilicates exist including, for example, faujasite, analcite, paulingite, ptilolite, clinoptilolite, ferrierite, chabazite, gmelinite, levynite, erionite and mordenite.

Since not all types of natural crystalline aluminosilicates are available in abundance, considerable attention has been given to the production of synthetic materials. A number of synthetic molecular sieves are now commercially available and many others have been produced in the laboratory.

Among the synthetic molecular sieves, several are commercially available including synthetic faujasites and Zeolite A. Synthetic faujasite has the same crystalline structure as the natural material, but has a different composition. Synthetic faujasites having different silica-to-alumina ratios are designated as X molecular sieve and Y molecular sieve. The preparation of X molecular sieve is described in U.S. Patent 2,882,244 Milton, issued Apr. 14, 1959. The preparation of Y synthetic faujasite is described in Belgian Patent 577,642.

A 10X molecular sieve is an X type faujasite containing calcium cations.

Zeolite A has no corresponding natural form. Its preparation is described in U.S. Patents 2,882,243 Milton, and 2,982,612 Barrer et al.

Some of the other synthetic crystalline zeolites within the scope of the invention include, for example, Y zeolite, B zeolite, E zeolite, F zeolite, G zeolite, H zeolite, K-G zeolite, J zeolite, L zeolite, M zeolite, K-M zeolite, Q zeolite, R zeolite, S zeolite, T zeolite, U zeolite, Z zeolite and others.

The crystalline aluminosilicates of the type described above may be converted to the $NH_4$ form by ion-exchange with solutions of ammonium salts, such as ammonium sulfide, ammonium sulfite, ammonium chloride, ammonium bromide, ammonium fluoride, ammonium iodide, ammonium acetate and equivalents.

The extent of replacement of the original metal cations with ammonium ions may be controlled by varying the concentration of the exchange solutions, the period of treatment, the number of contacts between solution and sieve, the ratio of the amount of exchange solution-to-sieve, and the temperature of the solution. In this manner, the replacement may be varied from a few percent to well over 90% of the original metal cation content. In many cases, it is preferred to replace at least about 75% of the original cations in order to obtain a catalyst of the desired high activity.

Once the crystalline aluminosilicate has been converted to the $NH_4$ form by ion exchange with a solution of an ammonium salt, it is separated from the aqueous exchange solution and is dried to remove substantially all moisture. In this way, the H form, produced in a subsequent step, is never in contact with an aqueous environment. The drying may conveniently be accomplished with heating, for example, at about 350° F.–650° F. for about 2–8 hours or more.

The dried, $NH_4$ form of the crystalline aluminosilicate is then contacted with an anhydrous gaseous acid at elevated temperature to decompose the ammonium ion to a volatile ammonium salt, leaving a hydrogen ion at the site. Suitable anhydrous, gaseous acids include the hydrogen halides, HCl, HBr and HI, and other acids, such as $H_2S$, $H_2Se$, HCN and acid anhydrides, such as $CO_2$, $SO_2$, and equivalents thereof.

The decomposition of the ammonium ion may be carried out by contacting the $NH_4$ form aluminosilicate in a moisture-free environment with a stream of anhydrous, gaseous acid at a temperature of from 700° F. to 1000° F. for a period of approximately 30 minutes. Sufficient acid is used to decompose substantially all of the ammonium present in the sieve.

The following non-limiting examples will be helpful in gaining a full appreciation of the present invention. These examples, however, are only intended to illustrate certain preferred embodiments of the invention.

Example I

Ammonium mordenite was prepared by exchanging 150 grams of natural Nova Scotia mordenite with a 23% aqueous solution of ammonium sulfide.

The exchange was conducted by treating 200 ml. of natural mordenite (5 micron particle size) with 300 ml. of 23% ammonium sulfide in a suitable container. The mixture was shaken and placed on a roller at room temperature for 3 hours after which it was removed and allowed to settle for one hour. The supernatant was decanted and replaced by fresh ammonium sulfide solution. This procedure was repeated three times over a 48 hour period with overnight settling after the second and fourth treatment. The supernatant was then removed by filtration and the resulting material was washed with water and dried at about 350° F. for about 18 hours (overnight). The resulting ammonium mordenite had about 80% of the original sodium ions replaced by ammonium ions.

The dried ammonium mordenite was then contacted with a stream of anhydrous, gaseous HCl at the rate of 10 ml./min. at 1000° F. for a period of 30 minutes.

To illustrate the advantage obtained in catalyzing reactions with the improved catalysts of the present invention, comparison was made of the results of the catalytic conversion of n-pentane using H crystalline aluminosilicate as prepared in Example 1 and ammonium exchanged crystalline aluminosilicates prepared by conventional methods.

The catalysts used for comparison were prepared according to the following examples.

Example II

Nova Scotian mordenite was exchanged according to the ion-exchange technique described in Example I. The ammonium mordenite, thus obtained, was washed with water and was heated at 350° F. until dry. The catalyst thus obtained was prepared without subsequent acid treatment.

Example III

A portion of the catalyst of Example II was calcined in an air stream for 30 minutes at 650° F. and for 90 minutes at 1000° F.

A 0.4 ml. sample of each of the catalysts of Examples I, II and III were tested for conversion of n-pentane at 500° F. A helium carrier gas was used to transfer n-pentane from a bubbler at 32° F. to the catalyst at a total flow rate of 10 ml./min. The products were analyzed chromatographically.

After a contact of 5 minutes, the catalyst of Example II was regenerated in air for 20 minutes at 1000° F. The catalyst was then alternately contacted with n-pentane for 5 minute periods and regenerated for 30 minute periods as shown in Table I.

The catalyst of Example III was tested in the same general manner as the catalyst of Example II, but the former was subjected to only two regeneration cycles as seen in Table I.

The catalyst of Example I was also tested in the same manner as the other catalysts, but only one regeneration was employed.

The following Table I summarizes the results of the tests.

TABLE I

| Catalyst | Air Regeneration | | Conversion (at 5 min.) Products, wt. percent | | | |
|---|---|---|---|---|---|---|
| | Minutes | ° F. | $C_1=C_4$ | $i=C_5$ | $C_6+$ | Total |
| Example I | | | 12.1 | 3.7 | 0.8 | 16.6 |
| | 30 | 1,000 | 13.7 | 4.5 | 0.7 | 19.9 |
| Example II | | | 3.4 | 1.5 | 0.2 | 5.1 |
| | 20 | 1,000 | 2.8 | 1.3 | 0.1 | 4.2 |
| | 30 | 1,100 | 5.7 | 1.7 | 0.2 | 7.6 |
| | 30 | 1,100 | 6.7 | 1.6 | 0.2 | 9.5 |
| | 30 | 1,300 | 10.3 | 7.0 | 1.1 | 18.4 |
| Example III | | | 3.5 | 1.5 | 0.2 | 5.2 |
| | 30 | 1,000 | 3.4 | 1.4 | 0.1 | 4.9 |
| | 30 | 1,300 | 13.0 | 7.3 | 1.1 | 21.4 |

From the above results, it will be seen that the activity of the catalyst of Example II increased over a period of 1½ hours upon calcination attended by coke burning on the surface of the catalyst. This extensive heat treatment was necessary to decompose the $NH_4$ ions so that the catalyst attained an activity exhibited by the catalyst of Example I in its initial conversion run.

The pre-calcined catalyst of Example III required an additional one hour of regeneration for decomposition of the $NH_4$ ions to the level initially present in the catalyst of Example I.

*Example IV*

Ammonium chabazite was prepared by adding one pint of 23% ammonium sulfide to 400 ml. of Nova Scotia chabazite (5 microns particle size). The mix was rolled for 2 hours, allowed to settle and then the supernatant liquid decanted. The procedure was repeated three times with overnight settling after the second and fourth exchanges. After a total of 72 hours contact, the catalyst was air dried at an ambient temperature. The unused portion (300 ml.) was rolled with 200 ml. of fresh ammonium sulfide for 3 hours and air dried after a 72 hour contact period.

A 1.5 ml. aliquot of ammonium chabazite thus prepared was dried for 30 minutes at 600° F. in a helium stream after which it was treated with a 10 ml./minute hydrogen sulfide stream at 1000° F. The hydrogen chabazite catalyst obtained was checked for n-hexane cracking activity at 600° F. for 5 minutes at a 10 ml./min. total flow rate using helium as a carrier gas to transfer n-pentane from a bubbler at 32° F. The catalyst was then regenerated for 30 minutes in air and retested.

*Example V*

A 1.5 ml. aliquot of ammonium chabazite as prepared in Example IV was dried in a helium stream for 30 minutes at 600° F. for 30 minutes at 1000° F. and was tested for hexane cracking as in Example IV.

The following Table II summarizes the results obtained in Examples IV and V.

TABLE II

| Catalyst | Air Regeneration | | Conversion (at 5 min.) Products, wt. percent | | |
|---|---|---|---|---|---|
| | Minutes | °F. | $C_1$-$C_5$ | i-$C_6$ | Total |
| Example IV | | | 10.5 | 0.2 | 10.7 |
| | 30 | 1,000 | 30.8 | 0.3 | 31.1 |
| Example V | | | 7.3 | Trace | 7.3 |
| | 30 | 1,000 | 27.8 | 0.2 | 28.0 |
| | 30 | 1,000 | 24.5 | 0.1 | 24.6 |

The catalyyst of Example IV had greater initial activity than that of Example V and showed an increase in activity after air regeneration at 1000° F.

*Example VI*

A 1.5 ml. sample of ammonium mordenite was prepared in the same manner as in Example I and was dried in helium at 600° F. for 30 minutes after which it was treated with a 10 ml./min. $SO_2$ stream at 1000° F. for 30 minutes. The resultant hydrogen mordenite was tested for hexane cracking as in Example IV.

*Example VII*

A 1.5 ml. sample of ammonium mordenite was prepared in the same manner as in Example I, dried in helium at 600° F. for 30 minutes and at 1000° F. for 30 minutes. The ammonium mordenite catalyst was tested for hexane cracking as in Example IV. The results of the hexane cracking of Examples VI and VII are summarized in the following Table III.

TABLE III

| Catalyst | Conversion (at 5 min.) Products, wt. percent | | |
|---|---|---|---|
| | $C_1$-$C_5$ | i-$C_6$ | Total |
| Example VI | 66.7 | 3.5 | 70.2 |
| Example VII | 60.3 | 2.7 | 63.0 |

The above data also demonstrates the initial conversion advantage of the catalyst of this invention.

*Example VIII*

A sample of ammonium-Y-type aluminosilicate was prepared by base exchanging a 5 ml. sample of sodium-Y aluminosilicate with three 25 ml. batches of 25% aqueous ammonium chloride using 10 minute contacts at room temperature for each exchange. The ammonium Y Zeolite thus produced was washed with 25 ml. water and dried overnight at 110° C.

A 0.4 ml. aliquot of this catalyst was heated in a helium stream at 600° F. for 30 minutes and then treated with HBr at 700° F. for 30 minutes. The resultant hydrogen-Y aluminosilicate was purged with helium at 1000° F. and tested for n-pentane conversion in the same manner described for Example I.

*Example IX*

A 0.4 ml. aliquot of ammonium-Y Zeolite as prepared in Example VIII was purged with helium for 30 minutes at 100° F. and 30 minutes at 1000° F. The ammonium-Y Zeolite was tested for n-pentane conversion in the same manner described for Example I.

*Example X*

A sample of ammonium Y as prepared in Example VIII was dried for 30 minutes at 600° F. followed by a $H_2S$ purge for 30 minutes at 700° F. The resultant hydrogen Y Zeolite catalyst was tested for n-pentane conversion in the same manner as Example I.

The results of the n-pentane conversions utilizing the catalysts of Examples VIII and IX and X are summarized in Table IV below.

TABLE IV

| Example | Regeneration, Minutes at 1,000° F. | Conversion (at 5 min.) Products, wt. Percent | | |
|---|---|---|---|---|
| | | $C_1$=$C_4$ | i-$C_5$ | Total |
| VIII | | 34.9 | 2.2 | 37.1 |
| IX | | 3.7 | 0.8 | 4.5 |
| | 60 (2 Regen.) | 5.7 | 1.1 | 6.8 |
| X | | 14.0 | 1.3 | 15.3 |

As can be seen from the above results, the ammonium zeolites reacted in an acid medium prior to pentane conversion showed the greatest initial catalytic activity.

The catalysts of the present invention may be used alone or in combination with other materials which may or may not have catalytic activity of their own. For example, an H mordenite, H synthetic faujasite, or other H crystalline aluminosilicate prepared according to this invention may be distributed in a matrix material to form a composite catalyst useful in cracking and in many other reactions. Suitable matrix materials include, for example, silica gel, alumina gel, thoria gel and co-gels of the foregoing, clays, such as kaolin type clays, refractory metal oxides, such as alumina and many other bonding materials.

The invention also contempaltes other treatments of the catalysts prepared in the present manner. For example, in some circumstances, it may be desirable to calcine the aluminosilicate before and/or conversion to the $NH_4$ form.

The aluminosilicates may also be treated by ion-exchange to replace at least some of the original metal cations with other metal ions, such as rare earth ions. Thus, the final aluminosilicate may be substituted by both hydrogen ions and other metal ions. A particularly useful combined substitution for producing cracking catalysts comprises both hydrogen and rare earth ion substitution to produce materials, such as rare earth exchanged H faujasite, rare earth exchange H mordenite, rare earth exchanged H 13X Zeolites, rare earth exchanged H Y Zeolites, and the like.

In addition to conversion reactions, such as those described in connection with Table I, the catalysts of the present invention are also useful in low temperature acid catalysis.

The present invention provides such a convenient method for producing H crystalline aluminosilicates that it is now feasible to ship, store or handle such catalysts in the $NH_4$ form and then quickly and efficiently convert them to the acid form just prior to use or in situ, where the system to be catalyzed is anhydrous and contains available gaseous acid.

The teachings of the present invention may be adapted by those skilled in the art in devising other embodiments thereof while still remaining within the spirit and scope as expressed in the following claims.

What is claimed is:

1. A method for producing the hydrogen ion-exchanged form of a crystalline aluminosilicate zeolite comprising contacting an ammonium exchanged crystalline aluminosilicate zeolite with sufficient anhydrous, gaseous acid in a moisture-free environment at a temperature between about 700 to 1000° F. for a time sufficient to decompose the ammonium ions.

2. The method of claim 1 wherein said crystalline aluminosilicate is a natural material.

3. The method of claim 1 wherein said crystalline aluminosilicate is mordenite.

4. The method of claim 1 wherein said crystalline aluminosilicate is a synthetic material.

5. The method of claim 1 wherein said crystalline aluminosilicate is a synthetic faujasite.

6. The method of claim 1 wherein said crystalline aluminosilicate is zeolite X.

7. The method of claim 1 wherein said crystalline aluminosilicate is zeolite Y.

8. The method of claim 1 wherein said crystalline aluminosilicate is zeolite A.

9. The method of claim 1 wherein said anhydrous, gaseous acid is a hydrogen halide.

10. The method of claim 1 wherein said anhydrous, gaseous acid is selected from at least one member of the group consisting of HCl, HBr, HI, $H_2S$, $H_2Se$, HCN, $CO_2$ and $SO_2$.

11. The method for producing the hydrogen ion-exchanged form of a crystalline aluminosilicate zeolite comprising:
ion-exchanging said crystalline aluminisilicate with an aqueous solution of an ammonium salt to replace at least some of the original metal cations of said crystalline aluminosilicate with ammonium ions, producing an ammonium ion-exchanged crystalline aluminosilicate,
drying said ammonium ion-exchanged crystalline aluminosilicate, and
contacting said ammonium ion-exchanged crystalline aluminosilicate with sufficient anhydrous, gaseous acid in a moisture-free environment at a temperature between about 700 and 1000° F. for a time sufficient to decompose the ammonium ions.

12. The method of claim 11 wherein said crystalline aluminosilicate is a natural material.

13. The method of claim 11 wherein said crystalline aluminosilicate is mordenite.

14. The method of claim 11 wherein said crystalline aluminosilicate is a synthetic material.

15. The method of claim 11 wherein said crystalline aluminosilicate is a snythetic faujasite.

16. The method of claim 11 wherein said crystalline aluminosilicate is zeolite X.

17. The method of claim 11 wherein said crystalline aluminosilicate is zeolite Y.

18. The method of claim 11 wherein said crystalline aluminosilicate is zeolite A.

19. The method of claim 11 wherein said anhydrous, gaseous acid is a hydrogen halide.

20. The method of claim 11 wherein said anhydrous, gaseous acid is selected from at least one member of the group consisting of HCl, HBr, HI, $H_2S$, $H_2Se$, HCN, $CO_2$ and $SO_2$.

21. The method of claim 11 wherein said ammonium salt is selected from at least one member of the group consisting of ammonium sulfide, ammonium sulfite, ammonium chloride, ammonium bromide, ammonium fluoride, ammonium iodide and ammonium acetate.

References Cited

UNITED STATES PATENTS

| | | | |
|---|---|---|---|
| 3,006,153 | 10/1961 | Cook | 62—48 |
| 3,130,006 | 4/1964 | Rabo et al. | 23—111 X |
| 3,140,252 | 7/1964 | Frilette et al. | 252—455 X |
| 3,178,365 | 4/1965 | Miale | 208—120 |

OTHER REFERENCES

Barrer et al.—"J. of The Chemical Society"—May 1952, pp. 1561–1571.

EDWARD J. MEROS, *Primary Examiner.*